UNITED STATES PATENT OFFICE.

WALTER SCHOELLER, OF CHARLOTTENBURG, AND WALTHER SCHRAUTH, OF BERLIN-HALENSEE, GERMANY, ASSIGNORS TO FARBENFABRIKEN VORM. FRIEDR. BAYER & CO., OF ELBERFELD, GERMANY, A CORPORATION OF GERMANY.

PHARMACEUTICAL PRODUCT.

1,012,923.

No Drawing.

Specification of Letters Patent. Patented Dec. 26, 1911.

Application filed December 19, 1910. Serial No. 598,113.

*To all whom it may concern:*

Be it known that we, WALTER SCHOELLER and WALTHER SCHRAUTH, doctors of philosophy, chemists, citizens of the German Empire, residing, respectively, at Charlottenburg, near Berlin, and Berlin-Halensee, Germany, have invented new and useful Improvements in New Pharmaceutical Products, of which the following is a specification.

Our invention refers to the production of mercury substituted esters of carboxylic acids which contain in their molecule an unsaturated carbon chain, that is substances of the type

in which A means an organic radical attached to carbon and R an alkyl or aryl radical. Such esters have proven to be valuable therapeutic agents.

For the preparation of our new substances we allow salts of mercury to react upon the above defined esters in alcoholic solvents. Besides pure alcohol, either a mixture of alcohol and water or, ether saturated with water have proved to be suitable solvents. Among the salts of mercury to be employed those are preferred which are soluble in alcohol, namely mercuric acetate and mercuric chlorid. The mercury substituted glycerin esters of the higher unsaturated fatty acids are of especial value as therapeutic agents. For the preparation of these esters it is not necessary that the glycerin esters should be employed in pure state, they may be used in the form of fats. The fats are best dissolved in aqueous methyl- or ethyl-alcohol or in a mixture of ethyl-alcohol and ether and allowed to stand with a quantity of an alcoholic solution of mercury salt, indicated by Hübl's iodin number of the fat employed, until tested with soda lye, mercuric oxid is not any more precipitated. In the same manner mercuric lecithins can be produced provided that at least one of the fatty acid components of the lecithin consists of an unsaturated fatty acid, for instance oleic acid.

The new compounds are whitish odorless substances, which are soluble in alcohol. Their alkaline salts are soluble in water. They have proved to be valuable antisyphilitics of a mild action and as they are not irritating nor corrosive, they are valuable for external and internal application and especially for subcutaneous injection. They contain the mercury so firmly combined that on adding a diluted solution of caustic alkali or a cold solution of ammonium sulfid no precipitate is obtained. A solution of from 0.1–0.2 grams may be used for one subcutaneous injection.

In carrying out our invention we can proceed as follows, the parts being by weight:—

Example 1: 5 parts of the methylic ester of cinnamic acid in 80% methylic alcohol are added to 9.8 parts of mercury acetate dissolved in methylic alcohol. The mixture is allowed to stand, until a sample tested with soda lye does not give any precipitate of mercuric oxid. This is usually the case after about 24 hours. The substituted mercury ester which probably is formed according to the following formula:

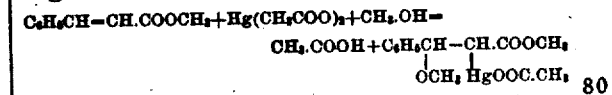

crystallizes out in compact crystals from the thus obtained solution and the rest is easily obtained by evaporization of the mother liquor. The ester is soluble in water and in the ordinary organic solvents, it can be best crystallized from acetic ether. From the aqueous solution of the ester the corresponding chlorid of the formula

is precipitated in a crystalline shape on the addition of halogen salts. In an analogous manner mercury compounds of almost all other known unsaturated esters may be obtained in a pure state and as well defined chemical substances.

Example 2: 5 parts of the ethylester of oleic acid dissolved in a mixture of ethyl alcohol, ether and water, are treated as above with 5 parts of mercury acetate. The solution, after standing for three hours is allowed to evaporate and the remaining oil which is slightly yellowish, very refractive and easily movable, is washed with water.

The amount of mercury contained in the oil is about 33 per cent. The product probably corresponds to the formula $C_8H_{17}.CH(OC_2H_5).CH(H_gOOCCH_3).C_7H_{14}COOC_3H_5$.

Example 3: 25 parts of triolein are dissolved in a mixture of methyl and ethyl alcohol or ether and water and treated with 25 parts of mercury acetate as above. After evaporation a yellowish, semi-fluid oil is obtained which is soluble in fatty vehicles. Instead of the pure triolein mixed fats and oils, such as linseed-oil, rapeseed-oil, palm-oil, wool-fat, olein, margarin, olive-oil, whale-oil, etc., can be used. But these oils and fats must be preferably free from free fatty acids. The quantities required for the reaction are easily calculated from the iodin number.

Example 4: 5 parts of lecithin containing oleic acid in its molecule are treated with 2 parts of mercury acetate as above. After about 24 hours a mercury lecithin can be isolated from the solution as a dark colored unctuous mass, insoluble in water but soluble in alcohol, benzene and acetone.

We claim:—

The herein described mercury substituted esters of carboxylic acids which contain in their molecule an unsaturated carbon chain which are odorless compounds, soluble in alcohol, containing the mercury so firmly combined that the aqueous solutions do not give any precipitate on the addition of dilute caustic soda lye or a cold solution of ammonium sulfid; and being valuable therapeutical agents, substantially as described.

In testimony whereof we have hereunto set our hands in the presence of two subscribing witnesses.

WALTER SCHOELLER.
WALTHER SCHRAUTH.

Witnesses:
 WOLDEMAR HAUPT,
 HENRY HASPER.